(12) United States Patent
Palliser

(10) Patent No.: US 6,230,997 B1
(45) Date of Patent: May 15, 2001

(54) ADJUSTABLE SENSOR FOR SAFETY BELT RETRACTOR

(75) Inventor: Martyn Palliser, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/373,422

(22) Filed: Aug. 12, 1999

(30) Foreign Application Priority Data

Dec. 17, 1998 (GB) .................................................. 9827994

(51) Int. Cl.$^7$ .................................................. B60R 22/40
(52) U.S. Cl. .................................... 242/384.4; 242/384.2; 242/384.5; 280/806; 280/807
(58) Field of Search .............................. 242/384.4, 384, 242/384.2, 384.5; 280/806, 807; 297/478, 480

(56) References Cited

U.S. PATENT DOCUMENTS 4,645,138  2/1987  Kapanka .......................... 242/107.4
4,765,559  8/1988  Crisp ................................. 242/107.4

FOREIGN PATENT DOCUMENTS 1068344  5/1967  (GB) .
2328184  2/1999  (GB) .

Primary Examiner—John Q. Nguyen
(74) Attorney, Agent, or Firm—Lonnie Drayer

(57) ABSTRACT

An adjustment mechanism for a safety belt retractor locking sensor has a shaft rotatably mounted in a lock cup spade of a retractor and a cam part eccentrically mounted relative to the shaft. The cam part is received within an elliptical hole in the housing. Rotation of the cam part about the axis of the shaft causes the housing to move relative to the lock cup spade. Projections on the spade engaging in the vertical slots in the housing constrain the housing to move substantially vertically. Vertical adjustment of the housing relative to the retractor affects the position of the lever tip relative to the ratchet wheel of the retractor.

23 Claims, 10 Drawing Sheets

ADJUSTABLE SENSOR FOR SAFETY BELT RETRACTOR

FIELD OF THE INVENTION

The present invention relates to an adjustment mechanism for a safety belt retractor locking sensor, adjustable height locking sensor and safety belt retractor including an adjustment mechanism for the locking sensor.

BACKGROUND OF THE INVENTION

One known locking sensor for a vehicle safety belt retractor comprises a mass arranged to tip over at a predetermined angle of inclination or level of acceleration. The mass is connected to a rod that engages a base of a lever. When the mass tips over, the rod pushes the lever so that the tip of the lever is moved into engagement with a toothed wheel on the retractor spool. Engagement of the lever tip with the wheel locks the lock cup to the wheel. The lock cup includes a cam surface. As the safety belt pays out further, the spool turns the toothed wheel and thus the lock cup. As the lock cup rotates, the cam surface on the lock cup engages a pivotally mounted locking tooth, pushing the tooth into engagement with a further locking wheel on the spool thus preventing further rotation of the spool. It is the locking tooth engaging the locking wheel that prevents payout of the safety belt.

In the arrangement described, the gap between the lever tip and the ratchet must be closely controlled. If the gap is too large, poor locking performance will result. If the gap is too small, the belt will lock prematurely, erroneously and too frequently. That, in turn, will result in faults due to excessive wear on the retractor components and customer returns.

The gap size is very small and the build up of apparently insignificant manufacturing tolerances can vary the gap and affect the performance of the device quite significantly.

It has been proposed to provide some adjustment means to enable fine tuning of the lever tip position relative to the ratchet. One such example comprises a separate mechanism mounted directly to the retractor frame. The housing and lever are assembled to this mechanism which pivots at one end and is secured at the other by a screw. To adjust the tip gap the screw is loosened, the mechanism rotated about its pivot until the desired gap is obtained and the screw is tightened to hold the mechanism in position to maintain the gap.

That arrangement is rather large and it is difficult to maintain a reliable, consistent gap size from one retractor to another. Each retractor has to be measured and set individually which is time consuming and not readily repeatable.

DISCUSSION OF THE PRIOR ART

Adjustable features in safety belt retractors have been disclosed for example in: FIGS. 5 and 6 of UK patent publication 2 328 184A; FIG. 9 of UK patent publication 1 068 344A; FIG. 9 of U.S. Pat. No. 4,765,559; and FIG. 3 of U.S. Pat. No. 4,645,138.

SUMMARY OF THE INVENTION

It is an object of the present invention to provide an improved adjustment mechanism.

According to a first aspect of the invention there is provided an adjustment mechanism for a safety belt retractor locking sensor, comprising a first part mountable to a mounting member such as a lock cup spade or a mechanism bush, a second part mountable to a housing of the sensor, one of the parts being rotatable and conversion means for converting rotational displacement of said one part into relative translational displacement, between the housing and the lock cup spade.

According to a second aspect of the invention there is provided a safety belt retractor locking sensor comprising a sensor member arranged on a housing so as to cause locking of the retractor when the sensor is subjected to appropriate force, the housing being mountable on a lock cup spade of a retractor, the sensor having an adjustment mechanism comprising a first part mountable to a lock cup spade of a retractor, a second part mounted to the housing, one of the parts being rotatable, the adjustment mechanism further comprising conversion means for converting rotational displacement of said one part into translational displacement between the housing and the lock cup spade.

According to a third aspect of the invention there is provided a safety belt retractor comprising a lock cup spade and a locking sensor, the sensor including a housing movably mounted to the lock cup spade, the sensor being arranged to lock the retractor when subjected to appropriate force, the sensor including an adjustment mechanism comprising a first part mounted to the lock cup spade of the retractor, a second part mounted to the housing of the sensor, one of the parts being rotatable, the adjustment mechanism further comprising conversion means for converting rotational displacement of said one part into relative translational displacement between the housing and the lock cup spade.

In that way, the adjustment mechanism can be used to fine tune the position of the lever tip of the locking sensor relative to the ratchet of the retractor so as to provide optimum performance of the locking sensor.

Preferably the first and second parts are rotatably mountable.

In a preferred embodiment the first and second parts are formed in one piece. Most preferably, the first and second parts are integrally molded.

The conversion means may be provided partly on the lock cup spade. In a preferred embodiment the conversion means comprises a toothed rack formed in the lock cup spade and the first part comprises a toothed wheel arranged to engage the teeth of the toothed rack, the second part being rotatably mounted within the housing, whereby rotation of the second part, rotates the first part so that the toothed wheel moves along the toothed rack so as to move the housing relative to the lock cup spade.

In another embodiment the conversion means comprises a cam member on the second part and a cam surface formed in the housing. In such a case, the first and second parts are integral and the cam member rotates about the axis of rotation of the first part, the cam member following the cam surface formed in the housing so as to move the housing relative to the lock cup spade. In a preferred embodiment of the camming arrangement the cam member of the second part comprises a substantially circular member arranged eccentrically of the axis of rotation of the first part. Most preferably the cam surface comprises a slot in the housing. In such a case, means may be provided on the second part to effect rotation of the first and second parts. The means to effect rotation may be a projecting knob arranged coaxially of the first part whereby rotation of the knob rotates the first part within its rotational mounting so as to rotate the cam member also. Alternatively, the means to effect rotation may be a slot formed in the second part and arranged on the axis of rotation of the first part to allow manipulation by means of a suitable tool, for example a screwdriver.

Preferably, the housing is slidably mounted on the lock cup spade. In a preferred embodiment a track is provided on either the lock cup spade or housing and a projection is provided on the other of the lock cup spade and housing, the projection projecting into the track, so as to effect the aforesaid sliding mounting of the housing on the lock cup spade. Most preferably two such tracks are provided and two corresponding projections are provided. The, or each, track preferably comprises a slot. The, or each, track may also include a stop to restrict the extent of sliding movement of the housing. In that way, adjustment of the sensor can be limited between end positions so that the sensor cannot be accidentally adjusted too close to the ratchet or too far away from the ratchet. The slots on the housing are shown in the vertical position but these are notched in on the assembly line and may be positioned at approximately +/−15° about the vertical direction. With the slots arranged at different angles, the position of the housing which the mass sits on can be chosen according to different installation angles for different vehicles. Thus one housing can be used for various installations.

Where the first part is rotatably mounted and the second part includes the cam member the lock cup spade includes an aperture for mounting the first part in a rotatable manner. The aperture is defined by an inner wall and, in a preferred embodiment, a projecting tang is provided which projects inwardly of the aperture so as to engage the first part, the first part having a crenellated peripheral surface with which the projecting tang interdentates. In that way, a positive input of force must be provided in order to rotate the first part so to as to effect adjustment of the locking sensor. Each crenellation that the tang passes over will cause a click. That arrangement reduces the possibility of an accidental adjustment of the locking sensor and also provides the possibility of automating the adjustment. The first of the batch of sensors is adjusted manually until the correct position is attained and the number of crenellations that the tang passes over during the adjustment is noted and programmed into an automated adjustment mechanism. In that way only occasional checks need be made on the adjustment mechanism of a batch of sensors in order to ensure optimum performance of the sensors and automation of production. Alternatively, the optical sensor may be provided in order to measure the gap size and automatically adjust each housing sensor appropriately.

In the embodiment where the second part is rotatably mounted in the housing and the first part comprises a toothed wheel engaging in the toothed rack on the lock cup spade, the aperture in the second part may include an inwardly projecting tang and the second part may have a crenellated outer surface to provide the results mentioned above.

DETAILED DESCRIPTION OF THE INVENTION

Figure 1:
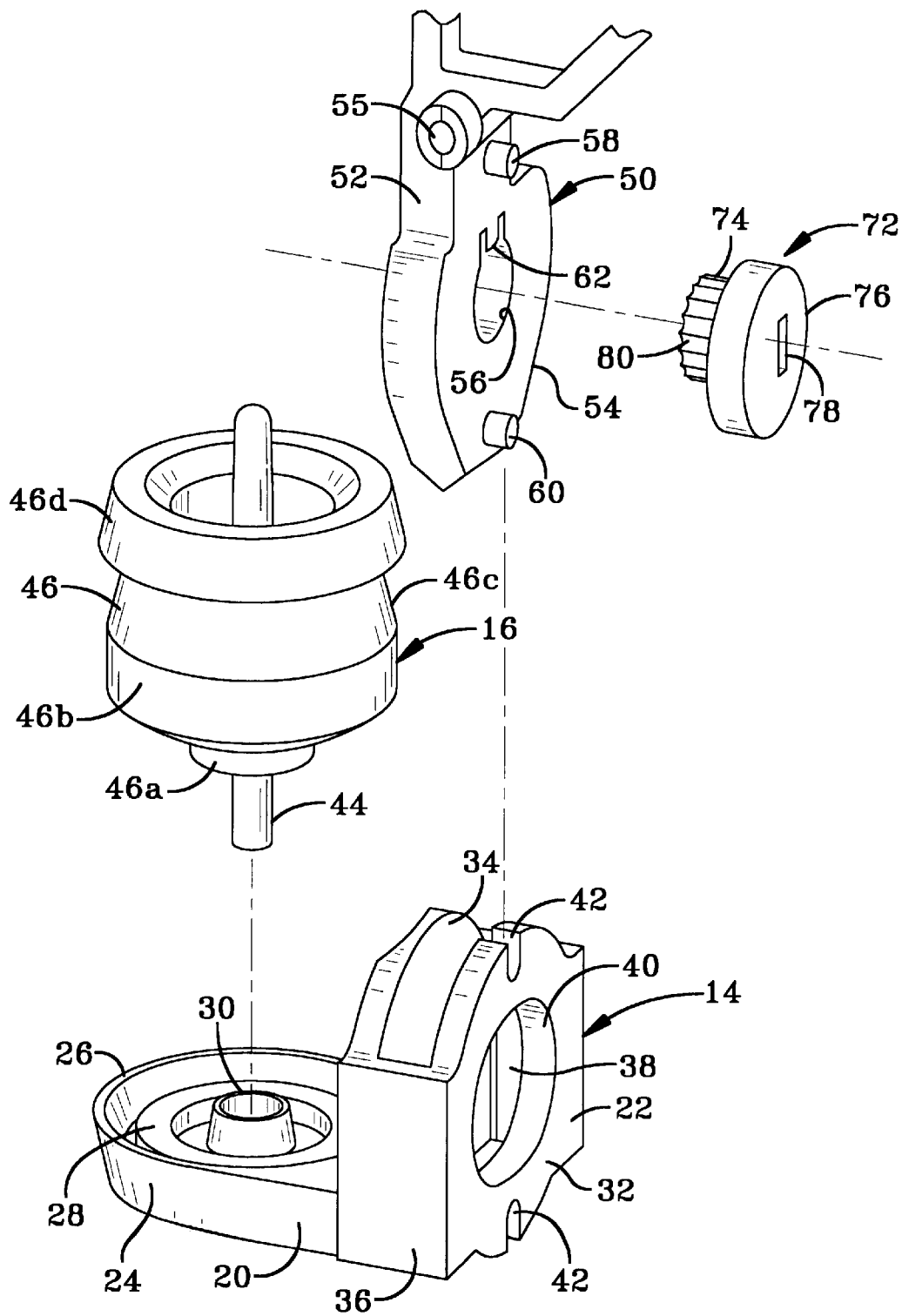
FIG. 1 is an exploded perspective view of part of a seat belt retractor including an adjustable locking sensor in accordance with the invention.
Figure 2:
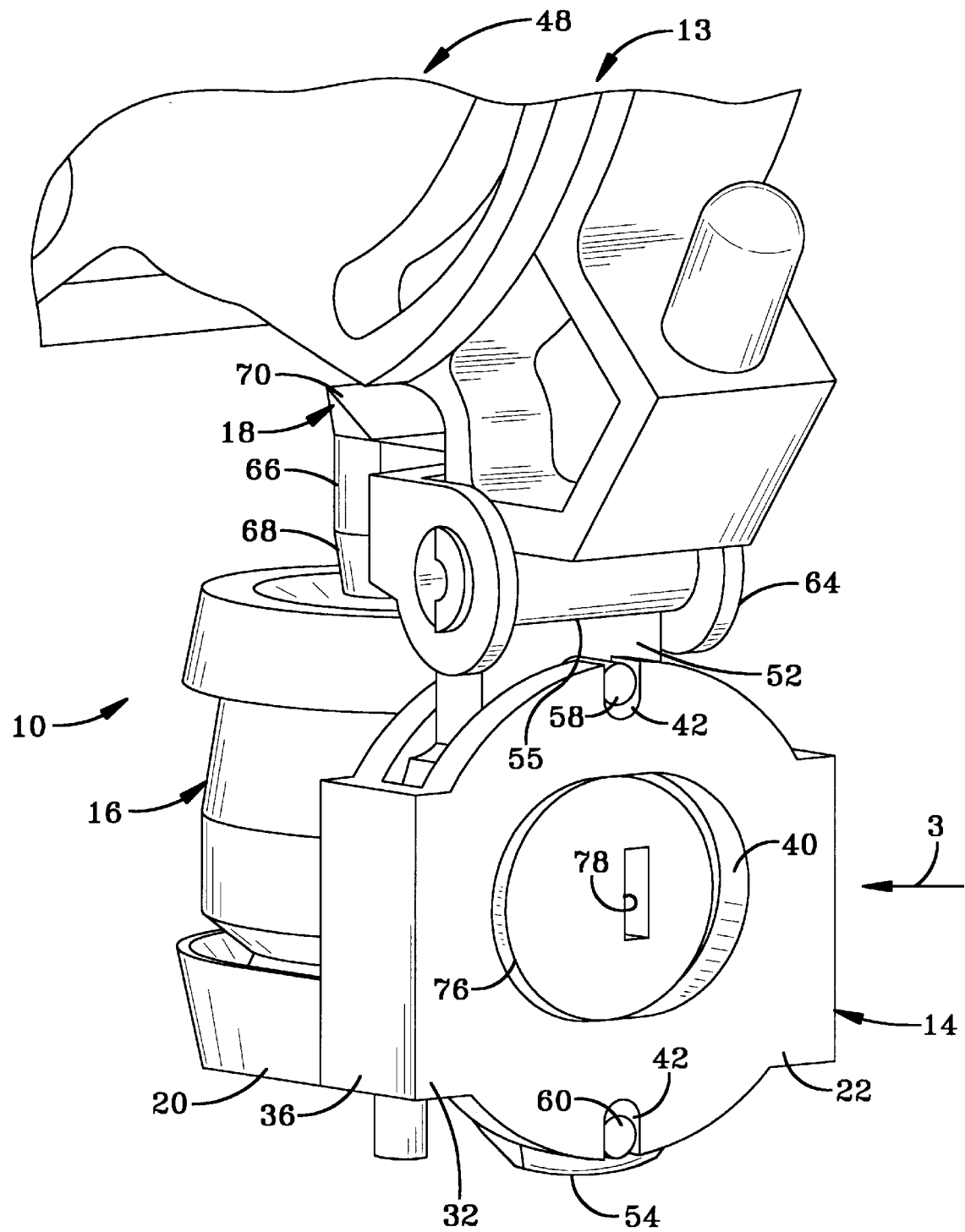
FIG. 2 is a perspective view of the retractor of FIG. 1.

In FIGS. 1 and 2 a locking sensor 10 for a seat belt retractor 13 comprises a support 14, a mass assembly 16 arranged on the support 14 and a lever assembly 18 coupled with the mass assembly.

The support 14 comprises a mass assembly support 20 and a mounting part 22. The mounting part mounts the support 14 to the retractor 13.

The mass assembly support 20 comprises a substantially circular, plate-like body 24 with an upstanding peripheral rim 26. An annular projection 28 is formed concentrically of the body 24. A hollow frustoconical projection 30 is formed within the annular projection and is arranged to project above the annular projection. An aperture (not shown) is formed centrally of the frustoconical projection 30.

The mounting part 22 comprises a front wall 32, a rear wall 34 and side walls 36, 38 that define a collar. An elliptical hole 40 is formed in the front wall 32 of the mounting part 22. The front wall 32 also has vertical slots 42 formed respectively in the upper and lower edges thereof.

The mass assembly 16 comprises a central rod 44 extending through a hollow mass 46. The hollow mass 46 comprises a first cylindrical portion 46a, which retains the rod 44. A second cylindrical portion 46b that is wider than the first cylindrical portion 46a extends upwardly from the first cylindrical portion. A first frustoconical portion 46c, which tapers inwardly from bottom to top extends upwardly from the second cylindrical portion 46b and a second frustoconical portion 46d, wider than the first frustoconical portion 46c, which tapers inwardly from bottom to top, extends upwardly from the first frustoconical portion 46c. The upper part of the inner wall of the second frustoconical portion 46d is bevelled.

The mass assembly 16 is mounted on the mass assembly support 20. The rod 44 extends through the aperture in the support 20. The first cylindrical portion 46a of the mass 46 stands on the frustoconical portion 30 on the support. The tip of the rod engages the base of the lever tip of the lever assembly 18.

The retractor 13 includes a lock cup 48 that includes a projecting downward mounting member, which in the present embodiment is a lock cup spade 50 but could alternatively be a mechanism bush. The lock cup spade 50 comprises a shank 52 and a blade 54. The shank 52 includes pivot projections 55 projecting laterally from each edge thereof. The lever assembly 18 is pivotally mounted to the pivot projections 55. The blade 54 includes a bore 56 formed generally centrally thereof. An upper spigot 58 projects from the face of the shank 52 and a lower spigot 60 projects from the face of the blade 54 beneath the bore 56. The bore 56 includes an inwardly projecting tang 62 which is formed by two short grooves cut into the edge of the bore 56.

The lever assembly 18 comprises a stirrup 64 that is mounted to the pivot projections 54 so as to pivot up and down. The end of the stirrup 64 spaced from the pivot projections 54 carries a lever tip 66. The lever tip 66 includes a base portion 68 and a tooth 70 that extends from the base portion 68 towards a toothed wheel (not shown) with the lock cup 48.

As stated above the tip of the rod 44 engages the underside of the base portion 68 of the lever tip 66.

When the vehicle in which the retractor 13 is mounted decelerates the mass 46 tips over. The mass 46 tips about the edge of the lower cylindrical portion 46a thereof. The rod 44 moves upwardly against the underside of the base portion 68 of the lever tip 66. The rod 44 pushes the lever tip 66 up so that the tooth engages the toothed wheel of the spool. The retractor spool is then locked as described above.

The support 14 is mounted to the retractor by means of the mounting part 22.

As stated previously, the mounting part comprises front, rear and side walls 32, 34, 36 and 38 that define a collar. In order to mount the support 14 on the retractor 12 the collar is arranged around the blade 54 of the lock cup spade 50. The spigots 58, 60 on the lock cup spade 50 engage in the slots 42 in respective upper and lower edges of the front wall 32 of the mounting part 22. The spacing of the spigots 58, 60 and sizing of the slots 42 is such that some vertical play is allowed in the mounting of the support 14 but that horizontal play is substantially eliminated.

As mentioned above the gap between the tooth 70 of the lever tip 66 and the toothed wheel (not shown) of the lock cup 48 needs to be carefully controlled. In the present invention the control of that gap is effected by adjustment of the position of the support 14. Vertical adjustment of the support 14 brings about a corresponding adjustment in the position of the rod 44 which engages the underside of the base portion 68 of the lever tip 66 which in turn adjusts the position of the tooth 70 of the lever tip 66. In the present embodiment the adjustment of the support 14 is effected by a cam arrangement described below.

The cam arrangement comprises a cam member 72 that is arranged between the lock cup spade 50 and the support 14. The cam member 72 comprises a toothed shaft 74 which is in the form of a disc-like cylinder and a circular cam part 76, again in the form of a disc-like cylinder having a greater diameter than that of the shaft 74. The shaft 74 extends from the face of the cam part 76. The shaft 74 is arranged eccentrically of the cam part 76. A recess 78 is arranged in the opposite face of the cam part 76 on the access of the shaft 74.

The shaft 74 is received in the bore 56 in the blade 54 of the lock cup spade 50. The tang 62 in the bore 56 is arranged to interdentate with the teeth 80 of the shaft 74. The cam part 76 is received in the elliptical hole 40 in the front wall 32 of the mounting part 22.

As can be seen in FIG. 2 the cam part 76 has a diameter which is substantially similar to the height of the elliptical hole 40 but which is slightly less than the width of the hole 40. When the cam member 72 is rotated about the axis of the shaft 74 the eccentrically mounted cam member 76 bears against the inner wall of the hole 40 to effect movement of the mounting part 14 relative to the lock cup spade 50. The spigots 58, 60 running in the slots 42 restrain the movement of support 14. Thus rotation of the cam member 72 effects vertical movement of the support 14 relative to the lock cup spade 50, which, in turn, effects adjustment of the tooth 70 of the lever tip 66 relative to the tooth wheel of the spool.

The tang 62 interdentating with the teeth 80 requires that a positive input of force is needed in order to rotate the cam member 72. That force can be applied by inserting a tool, such as a screwdriver, into the recess 78 and applying a rotational force. The tang 62 and the teeth 80 are designed so that a resilient bias of the tang must be overcome in order to effect rotation about the axis of the shaft 74. Each tooth 80 that the tang 62 passes over will cause an audible "click". The audible "click" and incremental nature of the adjustment provides the ability for automated adjustment of the locking sensor. For example, in a batch of locking sensors the first few sensors can be adjusted manually until the optimum lever tip position has been attained and the number of "clicks" of adjustment required in each case can be noted. In that way, the correct amount of adjustment can be calibrated and recorded in automated adjustment apparatus. The automated adjustment apparatus may be arranged either to adjust the cam member 72 to a predetermined angle or to sense each "click" and adjust the cam member 72 for a predetermined number of "clicks". Alternatively, optical sensing means may be provided to sense the gap between the tooth 70 of the lever tip 66 and the toothed wheel of the lock cup 48. In such a case each sensor is adjusted to the optimum position automatically.

FIGS. 3 to 6 show the device of FIG. 1 in the uppermost and lowermost positions of the support 14.

Figure 3:
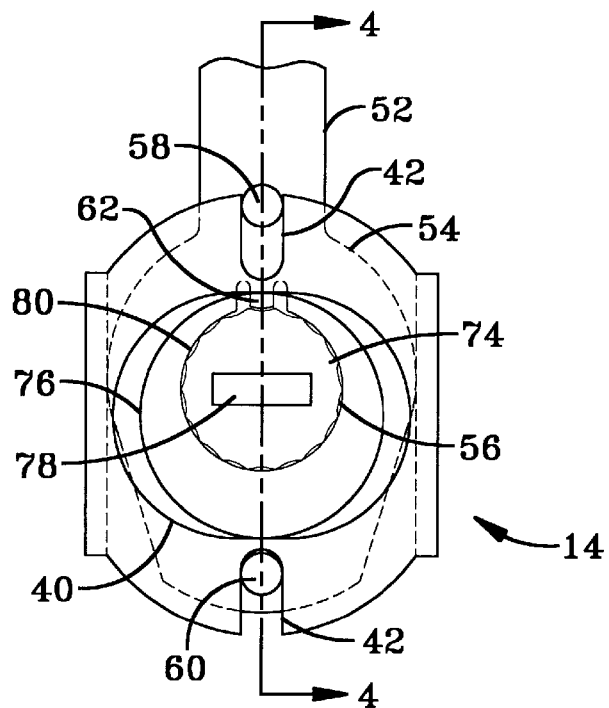
FIG. 3 is an end elevation of the retractor of FIG. 1 looking in the direction of arrow 3 in FIG. 2 with the locking sensor in its lowest position.
Figure 4:
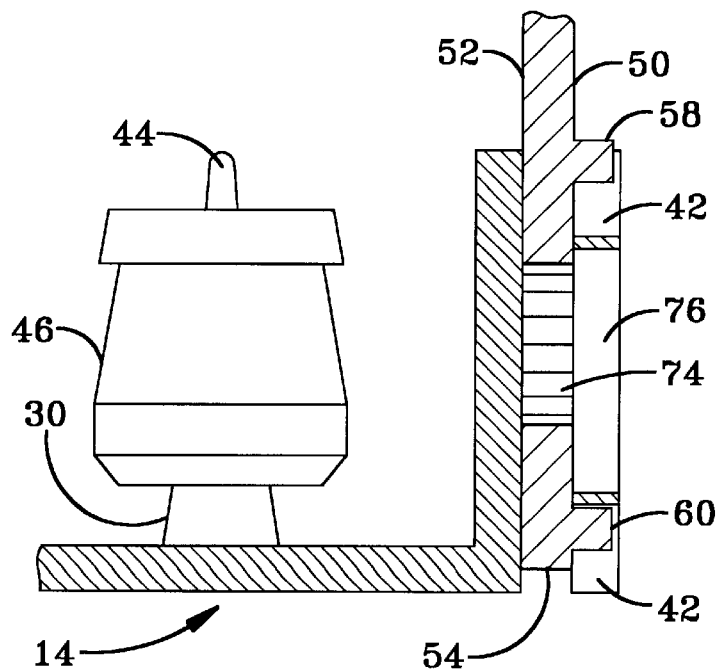
FIG. 4 is a cross section of the retractor of FIG. 1 taken on line 4—4 in FIG. 3.

FIGS. 3 and 4 show the support 14 in the lowermost position. The lower spigot 60 on the blade 54 of the lock cup spade 50 is in abutment with end of the slot 42 and the spigot 58 on the shank 52 of the lock cup spade 50 is almost out of its respective slot 42.

Figure 5:
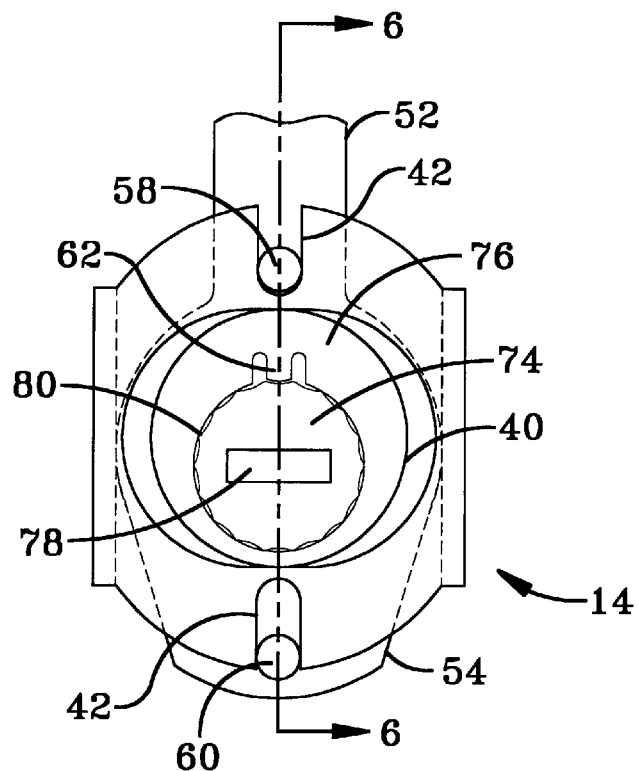
FIG. 5 is an end elevation similar to FIG. 3 with the locking sensor in its highest position.
Figure 6:
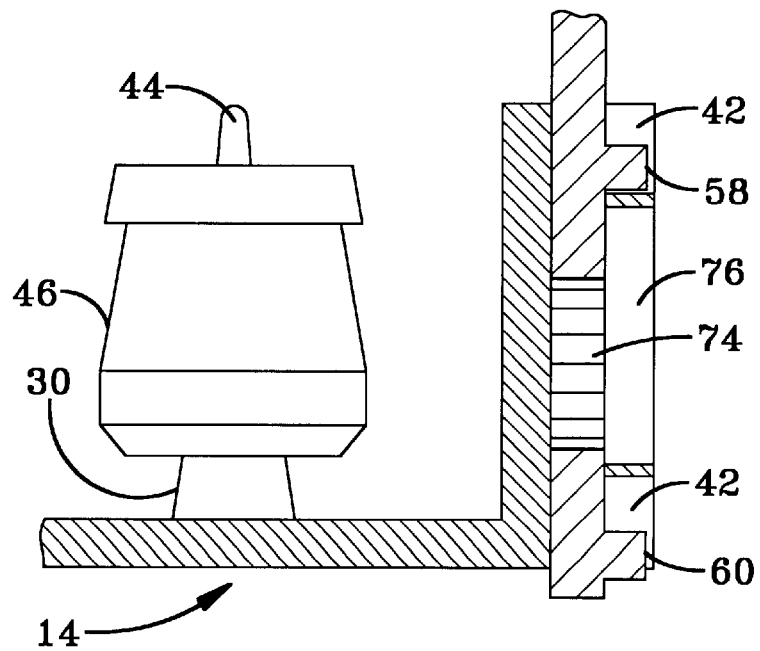
FIG. 6 is a cross section similar to FIG. 4 taken on line 6—6 in FIG. 5.

In FIGS. 5 and 6 the support is shown in the uppermost position. The spigot 58 abuts the end of the slot 42 and the spigot 60 is almost out of its respective slot 42. FIGS. 3 and 5 also show clearly the tang 62 interdentating with the teeth 80 with the shaft 74.

Figure 7:
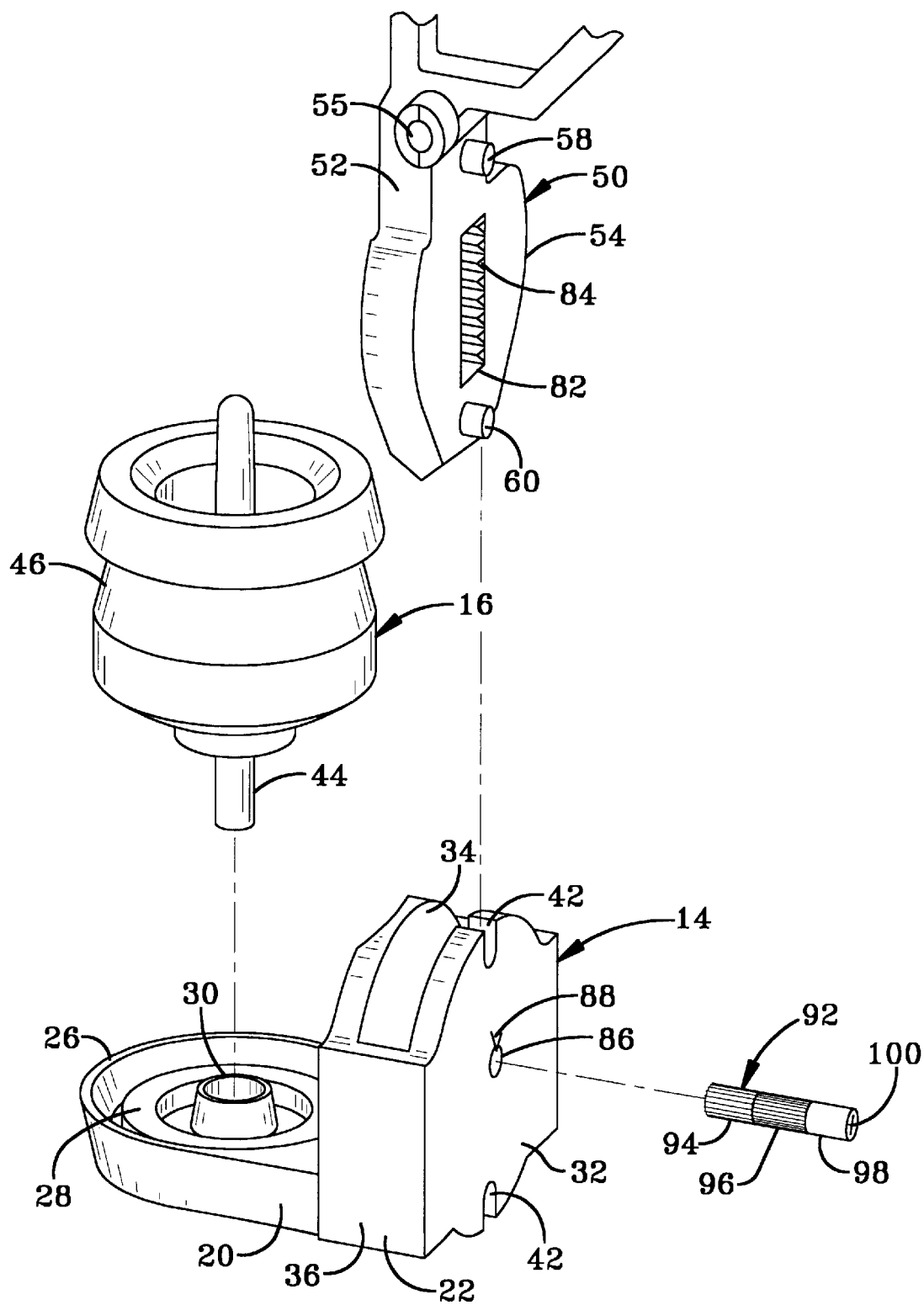
FIG. 7 is an exploded perspective view of part of another seat belt retractor including an adjustable locking sensor in accordance with the invention.
Figure 8:
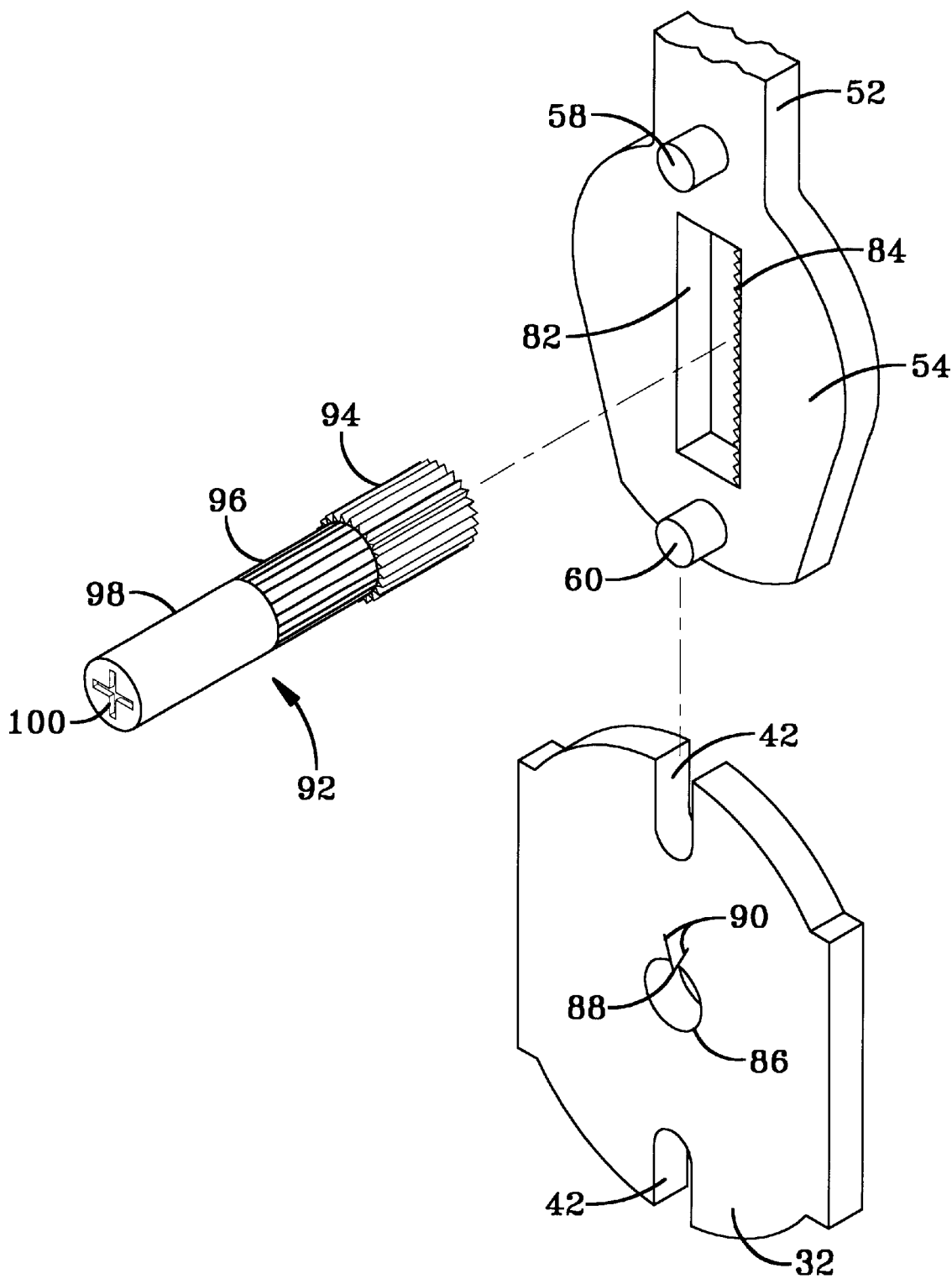
FIG. 8 is a perspective view of the adjustment mechanism of the retractor of FIG. 7.
Figure 9:
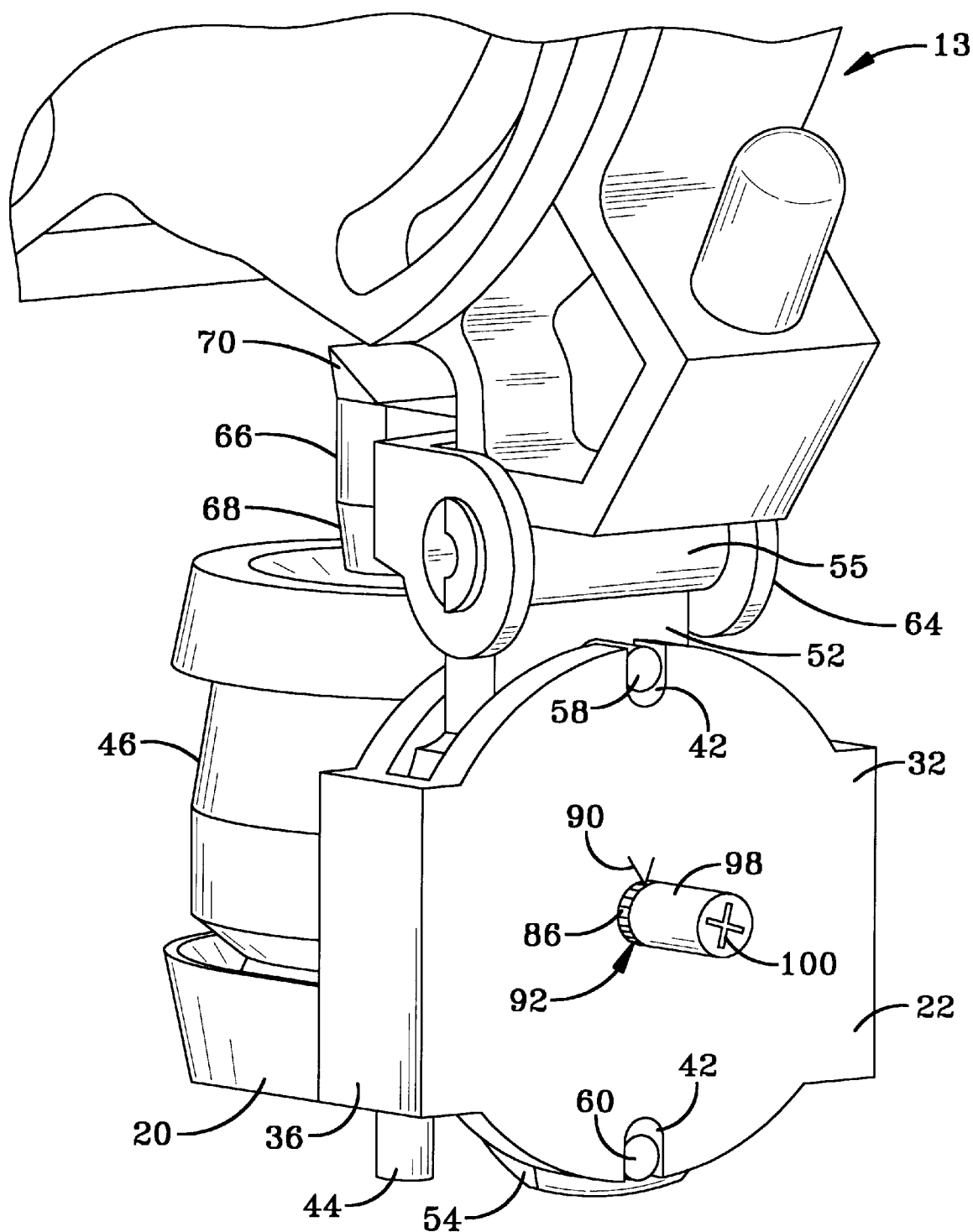
FIG. 9 is a perspective view of the part of the seat belt retractor shown in FIG. 7.

FIGS. 7 to 9 show an alternative embodiment of adjustment mechanism for the locking sensor. The locking sensor itself is identical to that shown in FIGS. 1 to 6 and parts corresponding to parts in FIGS. 1 to 6 carry the same reference numerals.

In FIG. 7 the blade 54 of the lock cup spade 50 is formed with a vertical slot 82 having a row of teeth 84 on one of its vertical inner walls.

The front wall 32 of the mounting part 22 of the support 14 is formed with a circular bore 86. The circular bore 86 is formed generally centrally of the wall 32 between the slots 42 in the upper and lower edges thereof. A tang 88 projects inwardly of a bore and is formed by two grooves 90 cut into the walls formed by the bore 86. The tip of the tang 88 projects slightly within the bore 86.

A drive member 92 in the form of on elongate circular rod is provided. The drive member 92 comprises a first toothed portion 94 at one end thereof, a second middle portion 96 formed with crenellations about the periphery thereof and a third handle portion 98 at the other end thereof. A recess 100 is formed in the end face of the handle portion 98 of the drive member 92. The recess is shaped to receive the head of a tool (not shown). In the embodiment shown the recess 100 is a cruciform recess for receiving a cruciform shaped toolhead. However, it will be appreciated that any appropriate shaped recess may be formed in order to mate with a corresponding toolhead.

When the support 14 is arranged on the lock cup spade 50 as in FIGS. 1 to 6, the drive member 92 is inserted through bore 86 into the slot 82. The toothed portion 94 extends into the slot 82 and the teeth thereof drivingly engage with the teeth 84 of the slot. The crenellated part 96 extends through the bore 86 and the tang 88 interdentates between the crenellations on the crenellated portion 96. The handle portion 98 extends from the slot 86 to allow manual adjustment of the position of the support 14. Rotation of the drive member 92 causes the toothed portion 94 to move along the toothed slot 82 which in turn causes the support 14 to move up and down relative to the lock cup spade 50. Another embodiment, not shown, a circular recess is formed in the rear wall 34 of the mounting part 22 of the support 14 which receives the distal end of the drive member 92 to reduce the bending stress on the member 92 during adjustment of the support 14.

Again in the embodiments of FIGS. 7 to 9 the spigot 58, 60 engaging in the slots 42 constrains the movement of support 14.

In another variant of the embodiment of FIGS. 7 to 9 the handle portion 98 may be omitted and the tool receiving recess 100 may be formed in the end face of crenellated portion 96 so that the drive member 92 does not protrude from the bore 86 and the end face 100 lies flush with the front wall 32. That arrangement is suitable where the adjustment is intended to be primarily automated, as described above in relation to the embodiment of FIGS. 1 to 6.

In FIGS. 10 to 13 a further embodiment of adjustment mechanism is shown. The sensor of FIGS. 10 to 13 is substantially similar to that shown in FIGS. 1 to 6 and parts corresponding to parts in FIGS. 1 to 6 carry the same reference numerals.

Figure 10:
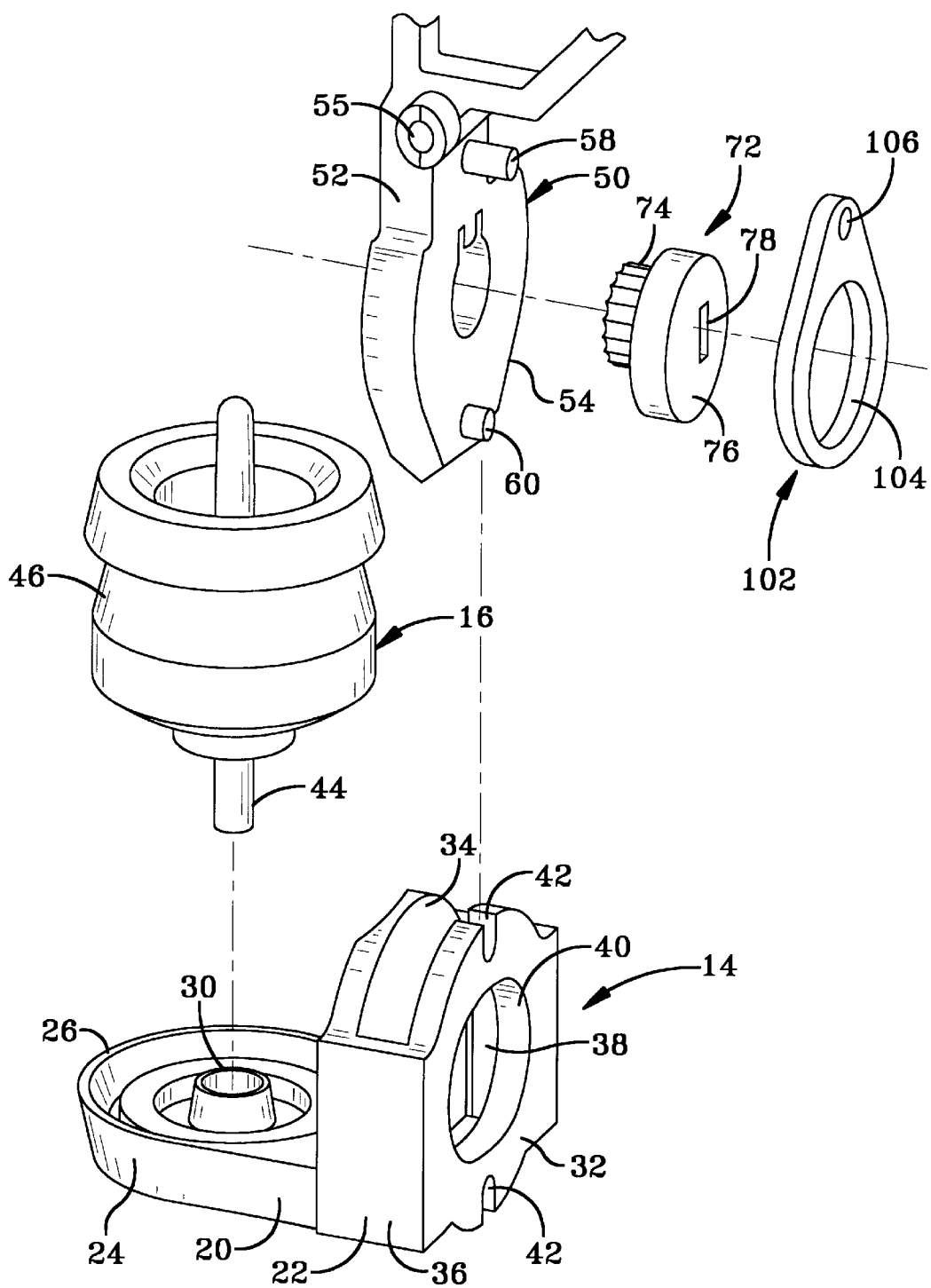
FIG. 10 is an exploded perspective view of part of another seat belt retractor including an adjustable locking sensor in accordance with the invention.
Figure 11:
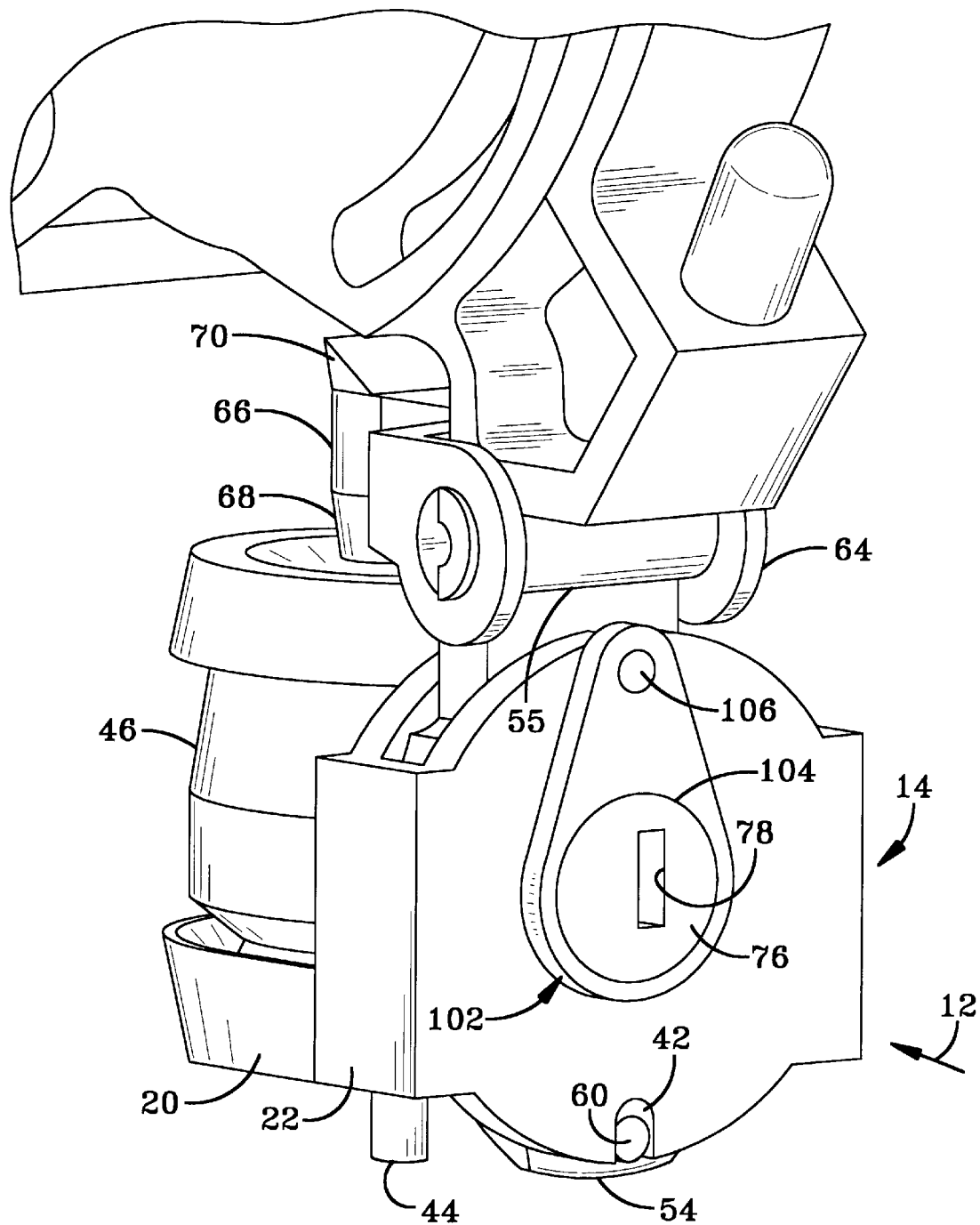
FIG. 11 is a perspective view of the retractor of FIG. 10.

In FIG. 10 the lock cup spade 50, mass assembly 16 and support 14 are substantially identical to those shown in FIG. 1. The upper spigot 58 in FIG. 10 is somewhat longer than that shown in FIG. 1 and is arranged to extend out of the slot 42 so as to stand proud of the front wall 32 of the mounting part 22 of the support 14.

The cam member 72 is similar to that shown in FIG. 1 with the exception that cam part 74 is slightly thicker so that it stands proud of the front wall 32 of the mounting part 22 of the support 14.

A connecting member 102 is arranged to connect the protruding section of the cam part 76 with the protruding section of the spigot 58. The connecting member 102 is pear-shaped and has a large circular aperture 104 and a small circular aperture 106 formed therethrough at opposite ends thereof.

The connecting member 102 is arranged on the support 14 so that the protruding part of the cam part 76 is received in the aperture 104 and the protruding part of the spigot 58 is received in the aperture 106.

When the cam member 72 is rotated, as in the embodiment shown in FIGS. 1 to 6, the cam part 76, which is arranged eccentrically of the shaft 74, pushes the connecting member 102 up and down relative to the lock cup spade 50. As the connecting member 102 is pulled down relative to lock cup spade 50, the support 14 is pulled, relatively, upwardly by means of the connecting member 102. As the connecting member 102 is pushed up relative to the lock cup spade so by the cam part 76 the support 14 is pushed away from the spigot 58, downwardly relative to the lock cup spade 50.

Figure 12:
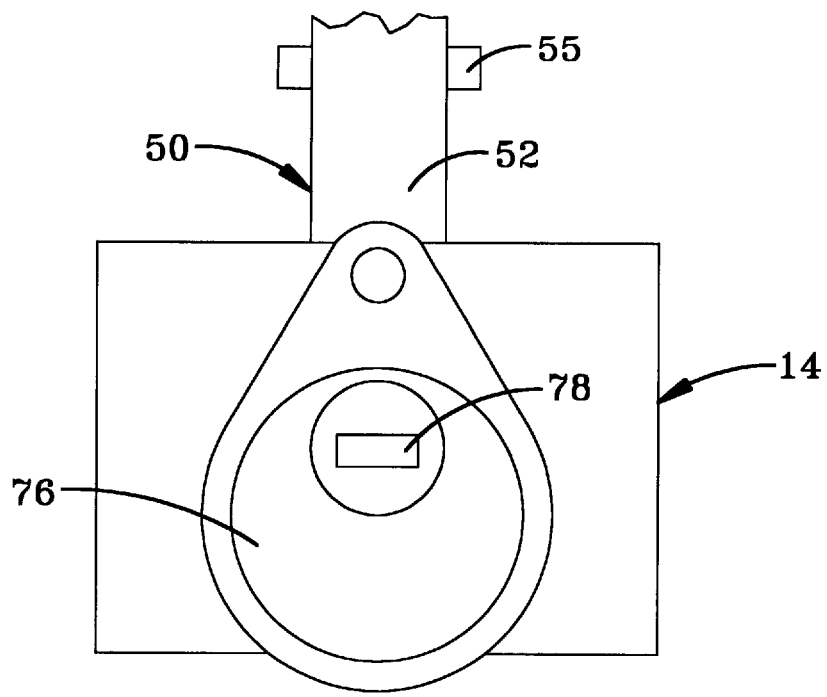
FIG. 12 is an end elevation of the retractor of FIG. 10 looking in the direction of arrow 12 in FIG. 11 with the locking sensor in the lowest position.
Figure 13:
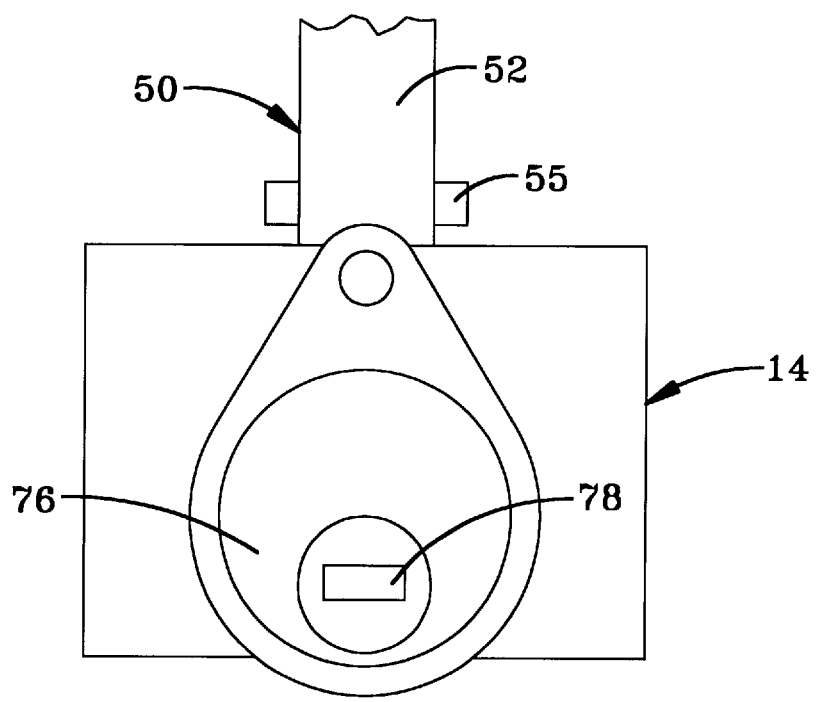
FIG. 13 is an end elevation similar to FIG. 12 with the locking sensor in the highest position.

FIGS. 12 and 13 show the cam member 72 in two positions. In FIG. 12 the cam member is arranged so that the support 14 is in its lowermost position. In FIG. 13 the cam member 72 is arranged so that the support 14 is in its uppermost position relative to the lock cup spade 50.

The present invention provides the benefit that the position of the lever tip can be adjusted during manufacture to account for manufacturing tolerances so that each sensor operates with optimum performance. In preferred embodiments the adjustment can be automated to allow for automatic adjustment by machine on an assembly line.

Many changes and modification in the above described embodiments of the invention can, of course, be carried out without departing from the scope thereof. Accordingly that scope is intended to be limited only by the scope of the appended claims.

I claim:

1. An adjustment mechanism for a safety belt retractor locking sensor, comprising a first part mountable to a mounting member of a retractor, a second part mountable to a housing of a sensor, one of the parts being rotatable and conversion means for converting rotational displacement of said one part into relative translational displacement between the housing and the mounting member.

2. The adjustment mechanism for a safety belt retractor according to claim 1 wherein the mounting member is a lock cup spade.

3. The adjustment mechanism for a safety belt retractor locking sensor according to claim 1 wherein both the first and second parts are rotatably mountable.

4. The adjustment mechanism for a safety belt retractor locking sensor according to claim 3 wherein the first and second parts are formed in one piece.

5. The adjustment mechanism for a safety belt retractor locking sensor according to claim 4 wherein the first and second parts are integrally molded.

6. The adjustment mechanism for a safety belt retractor locking sensor according to claim 1 wherein the sensor is arranged on a housing so as to cause locking of a retractor when the sensor is subjected to an appropriate force, the housing being mountable on a mounting member.

7. The adjustment mechanism for a safety belt retractor locking sensor according to claim 6 wherein the conversion means is provided partly on the mounting member.

8. The adjustment mechanism for a safety belt retractor locking sensor according to claim 7 wherein the conversion means comprises a cam member on the second part and a cam surface formed in the housing.

9. The adjustment mechanism for a safety belt retractor locking sensor according to claim 8 wherein the first part is rotatably mounted within a bore in the mounting member, the bore including an inwardly projecting tang and the first part having a crenellated peripheral surface, the tang being arranged to interdentate with the crenellations on the surface of the first part.

10. The adjustment mechanism for a safety belt retractor locking sensor according to claim 8 wherein the first and second parts are integral and the cam member rotates about the axis of rotation of the first part, the cam member following the cam surface formed in the housing so as to move the housing relative to the mounting member.

11. The adjustment mechanism for a safety belt retractor locking sensor according to claim 10 wherein the cam member comprises a substantially circular member arranged eccentrically of the axis of rotation of the first part.

12. The adjustment mechanism for a safety belt retractor locking sensor according to claim 8 wherein the cam surface comprises a slot in the housing.

13. The adjustment mechanism for a safety belt retractor locking sensor according to claim 12 further comprising a means to effect rotation of the first and second parts.

14. An adjustment mechanism according to claim 13 wherein the means to effect rotation is a projecting knob arranged coaxially of the first part.

15. The adjustment mechanism for a safety belt retractor locking sensor according to claim 13 wherein the means to effect rotation is a recess formed in the second part arranged on the axis of rotation of the first part to allow manipulation by means of a suitable tool.

16. The adjustment mechanism for a safety belt retractor locking sensor according to claim 7 wherein the conversion means comprises a toothed rack formed in a lock cup spade and the first part comprises a toothed wheel arranged to engage the teeth of the rack, the second part being rotatably mounted within the housing, whereby rotation of the second part rotates the first part so that the toothed wheel moves along the track so as to move the housing relative to the mounting member.

17. The adjustment mechanism for a safety belt retractor locking sensor according to claims 16 wherein the housing is slidably mounted on the mounting member.

18. The adjustment mechanism for a safety belt retractor locking sensor according to claim 17 wherein a track is provided on either the mounting member or housing and a projection is provided on the other of the mounting member and housing, the projection projecting into the track.

19. The adjustment mechanism for a safety belt retractor locking sensor according to claim 18 wherein the track includes a stop to restrict the extent of sliding movement of the housing.

20. The adjustment mechanism for a safety belt retractor locking sensor according to claim 18 wherein two tracks and two corresponding projections are provided.

21. The adjustment mechanism for a safety belt retractor locking sensor according to claim 16 wherein the second part is rotatably mounted within a bore in the housing, the bore including an inwardly projecting tang and the second part having a crenellated peripheral surface, the tang being arranged to interdentate with the crenellations on the surface.

22. The adjustment mechanism for a safety belt retractor locking sensor according to claim 1 further comprising an automated adjustment means whereby adjustment of the sensor is automated.

23. The adjustment mechanism for a safety belt retractor locking sensor according to claim 22 wherein the automated adjustment means comprises an optical sensor to determine the position of the locking sensor whereby the locking sensor is adjusted until the optical sensor determines that the locking sensor is positioned correctly.

* * * * *